United States Patent
Cooper et al.

(10) Patent No.: US 9,987,702 B2
(45) Date of Patent: Jun. 5, 2018

(54) NOZZLE CLEANER

(71) Applicant: ELCo Enterprises, Inc., Jackson, MI (US)

(72) Inventors: Edward L. Cooper, Clarklake, MI (US); Steven J. Hayes, Addison, MI (US)

(73) Assignee: ELCO ENTERPRISES, INC., Jackson, MI (US)

( * ) Notice: Subject to any disclaimer, the term of this patent is extended or adjusted under 35 U.S.C. 154(b) by 265 days.

(21) Appl. No.: 14/934,921

(22) Filed: Nov. 6, 2015

(65) Prior Publication Data

US 2017/0129038 A1    May 11, 2017

(51) Int. Cl.
*B23K 9/32*    (2006.01)
*B23D 75/00*    (2006.01)

(52) U.S. Cl.
CPC ............ *B23K 9/328* (2013.01); *B23D 75/00* (2013.01)

(58) Field of Classification Search
CPC ............ B23K 9/328; B23D 75/00; B08B 9/02
USPC .... 15/93.1, 104.02–104.05, 104.09, 104.095
See application file for complete search history.

(56) References Cited

U.S. PATENT DOCUMENTS

| | | | | |
|---|---|---|---|---|
| 4,426,749 A * | 1/1984 | Long | ........................ | B08B 9/00 15/104.095 |
| 4,583,257 A * | 4/1986 | Bridges | .................... | B23K 9/32 15/268 |
| 5,138,969 A * | 8/1992 | Thielmann | ............. | B23K 9/328 118/302 |
| 5,221,826 A * | 6/1993 | Lee | .......................... | B23K 9/32 15/93.1 |
| 5,845,357 A * | 12/1998 | Anderson | ........... | B05B 15/0208 15/104.05 |
| 6,023,045 A * | 2/2000 | Mangelsen | .............. | B23K 9/32 15/93.1 |
| 6,295,708 B1 * | 10/2001 | Spaid | ....................... | B23K 9/32 29/81.02 |
| 6,399,917 B1 * | 6/2002 | Simond | .................... | B23K 9/32 15/93.1 |
| 7,279,658 B2 * | 10/2007 | Schaefer | .................. | B23K 9/32 219/136 |
| 8,321,986 B2 | 12/2012 | Nakazima | | |

(Continued)

FOREIGN PATENT DOCUMENTS

| | | |
|---|---|---|
| DE | 20200701469 U1 | 1/2008 |
| JP | 2013 094818 A | 5/2013 |

OTHER PUBLICATIONS

International Search Report and Opinion for EP 16197423.3 dated Mar. 20, 2017 in corresponding application.

*Primary Examiner* — Weilun Lo
(74) *Attorney, Agent, or Firm* — Brinks Gilson & Lione (57) ABSTRACT

A system for cleaning a weld gun nozzle includes a guide module and a reaming module. The guide module includes a holder assembly that includes a plurality of elongate skid bars. The reaming module includes a rotatable reamer. The skid bars are generally non-rotatable and define an opening into which the weld gun nozzle can be inserted to align the nozzle with the rotatable reamer. The nozzle is guided by the skid bars and inserted over the reamer, which rotates within the nozzle to clean debris from the nozzle. The skid bars are non-rotatable, and can be installed within the holder assembly to be resiliently move radially inward and outward to accommodate the nozzle during insertion.

18 Claims, 10 Drawing Sheets

(56) References Cited

U.S. PATENT DOCUMENTS

2005/0211684 A1* 9/2005 Jaeger .................. B23K 9/26
 219/125.1
2009/0249567 A1 10/2009 Nakazima

* cited by examiner

NOZZLE CLEANER

BACKGROUND OF THE INVENTION

1. Field of the Invention

This invention relates generally to an apparatus for cleaning a nozzle of welding gun. In particular, the invention relates to a system for removing the spatter that can accumulate on the nozzle of a weld gun.

2. Description of the Related Art

Weld guns for use in gas metal arc welding are known in the art. Typically, the weld gun will include a nozzle at the welding end of the gun, where a consumable wire electrode is fed through the gun and the nozzle to the location where welding is desired. Additionally, shielding gas is fed through the weld gun and the nozzle at the location of the welding. The shielding gas operates to shield the weld location from outside contaminants. During the welding process, an electrical arc is formed between the wire electrode and the workpiece metal or metals, causing the metal or metals to weld and join the metals together.

During the welding process, when the arc is formed between the consumable electrode and the workpiece metal, the electrode can create weld spatter that will adhere to the surface of the nozzle, in particular the interior surface of the nozzle, which is undesirable. Spatter build up can affect the usability of the weld gun, decreasing the quality of the weld. Accordingly, it is necessary to clean the spatter from the weld gun nozzle during the welding process.

One method of cleaning of the nozzle is to manually chip away the spatter by scraping with a hand held cleaning tool or other device capable of scraping away spatter from the inside of the nozzle. However, this method is time consuming and inconsistent. Weld gun operators will often choose to disconnect the weld gun prior to cleaning, leading to delays in the welding process caused by disconnecting and reconnecting the weld gun to the system. Also, the operator may choose to wait for the nozzle to cool down prior to using the manual tool to avoid burning their hands. This also adds delays to the process.

Other cleaning solutions have been proposed that include a rotating cutting device that can be inserted into the weld nozzle. The rotating cutting device must be aligned with the interior of the nozzle so that the cutting surfaces of the cutter will fit snugly into the nozzle. Alignment of the nozzle with the axis of rotation of the cutter can be difficult, and misalignment can lead to damaging the cutter or the nozzle itself, resulting on costly replacement and further delays in the welding process.

One type of prior cleaning solutions includes the use of rollers mounted to an insertion housing. The rollers are generally circular and positioned on multiple sides of the path of insertion for the nozzle. However, these rollers can be insufficient to properly align the nozzle with the axis of rotation of the cutter due to the round nature of the roller, leading to the nozzle being inserted at an undesirable angle toward the cutter. In some cases multiple rollers have been arranged along the path, but the nozzle may still be inserted at an undesirable angle.

According, improvements can be made for cleaning the nozzles of a weld gun.

BRIEF DESCRIPTION OF THE DRAWINGS

FIG. 2 is an exploded view of a guide module of the nozzle cleaning system, including a holder assembly;

FIG. 6 is a cross-sectional view of the holder assembly, illustrating the outer holder member, the inner holder member, and the skid bars extending through the slots of the inner holder member and being attached to the outer holder via set screws and compression springs;

DETAILED DESCRIPTION

Figure 1A:
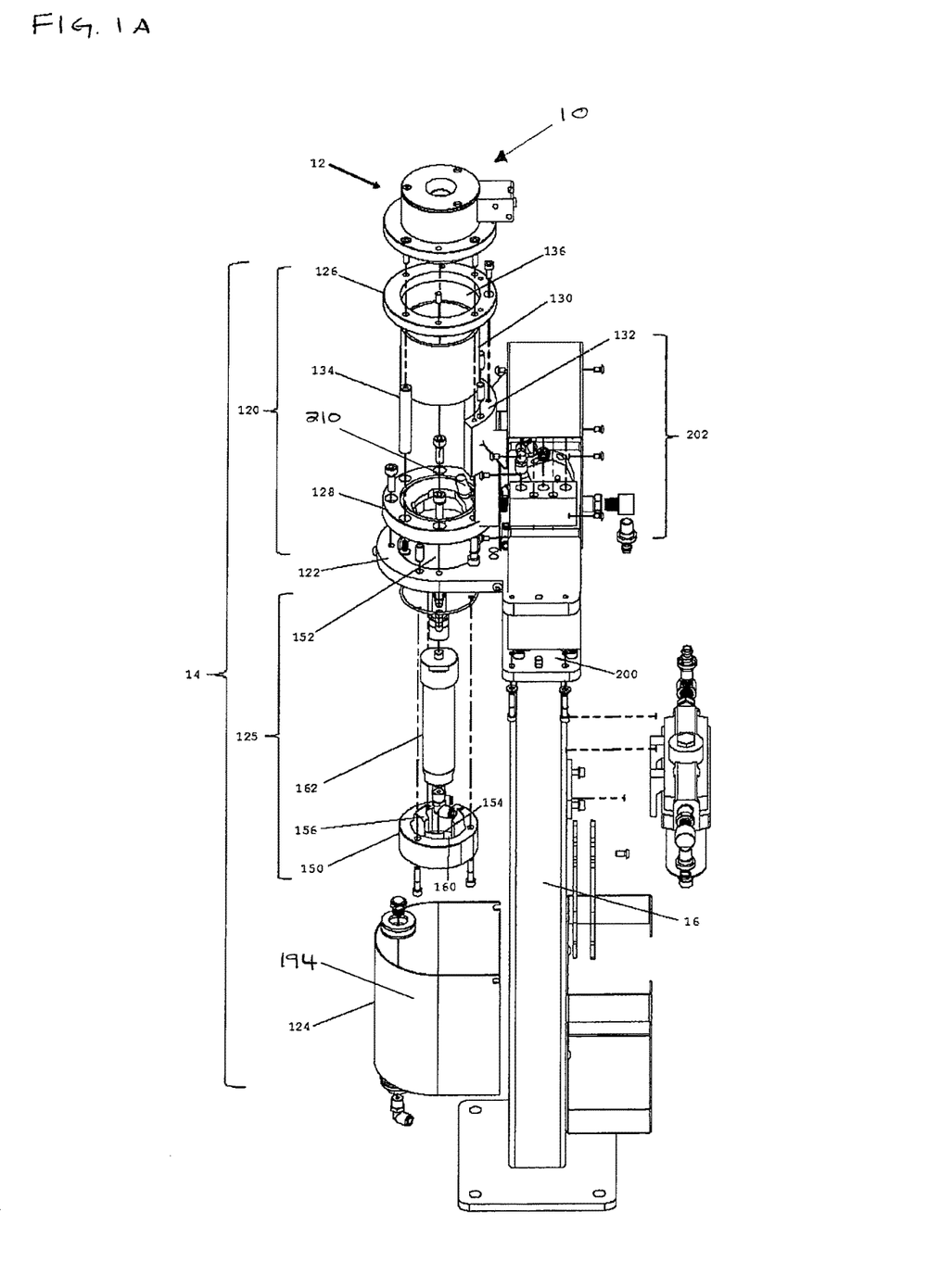
FIG. 1A is an exploded isometric view of a nozzle cleaning system.
Figure 1B:
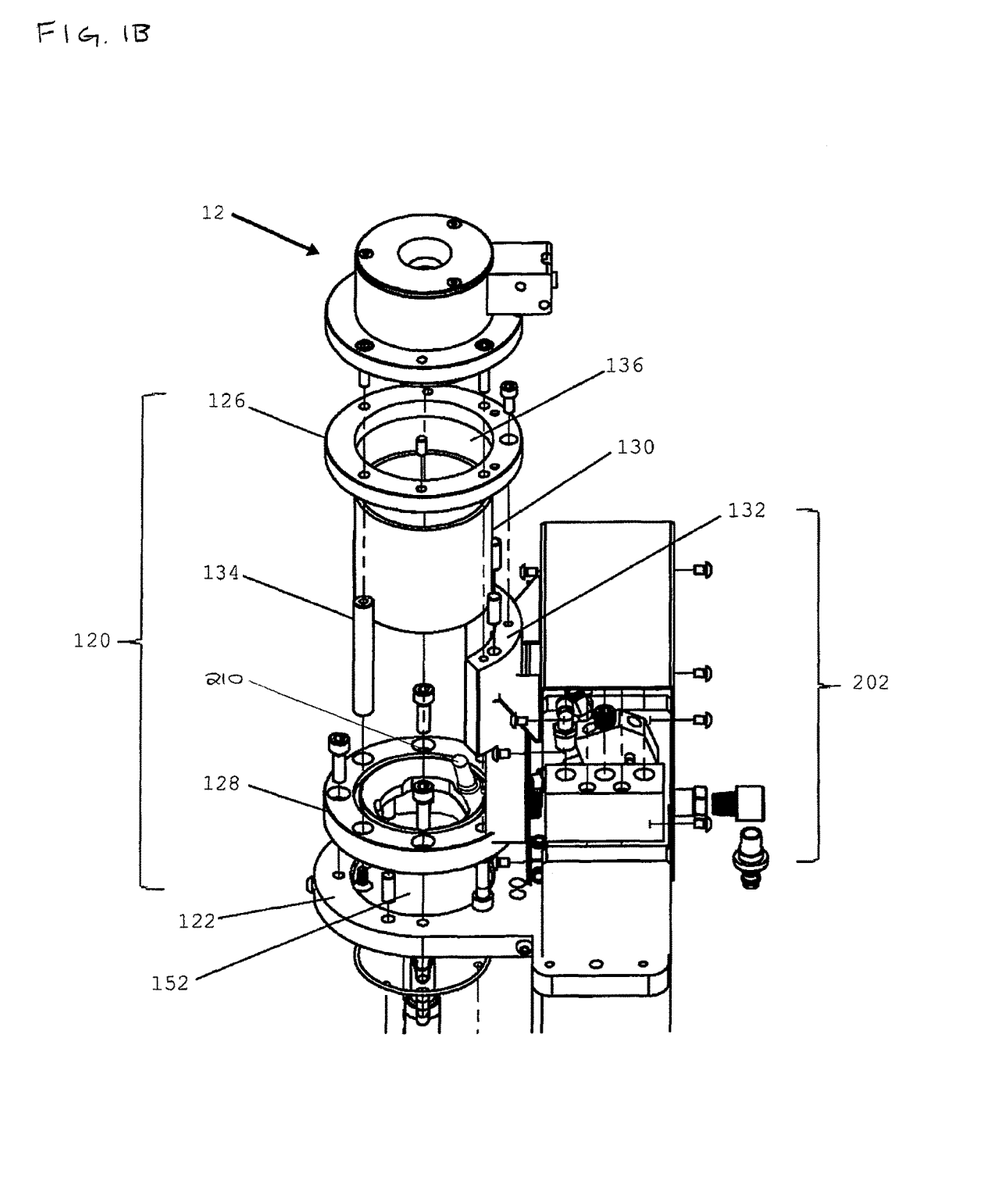
FIG. 1B is a partial exploded isometric view of the nozzle cleaning system, illustrating an upper can assembly and a guide module.
Figure 1C:
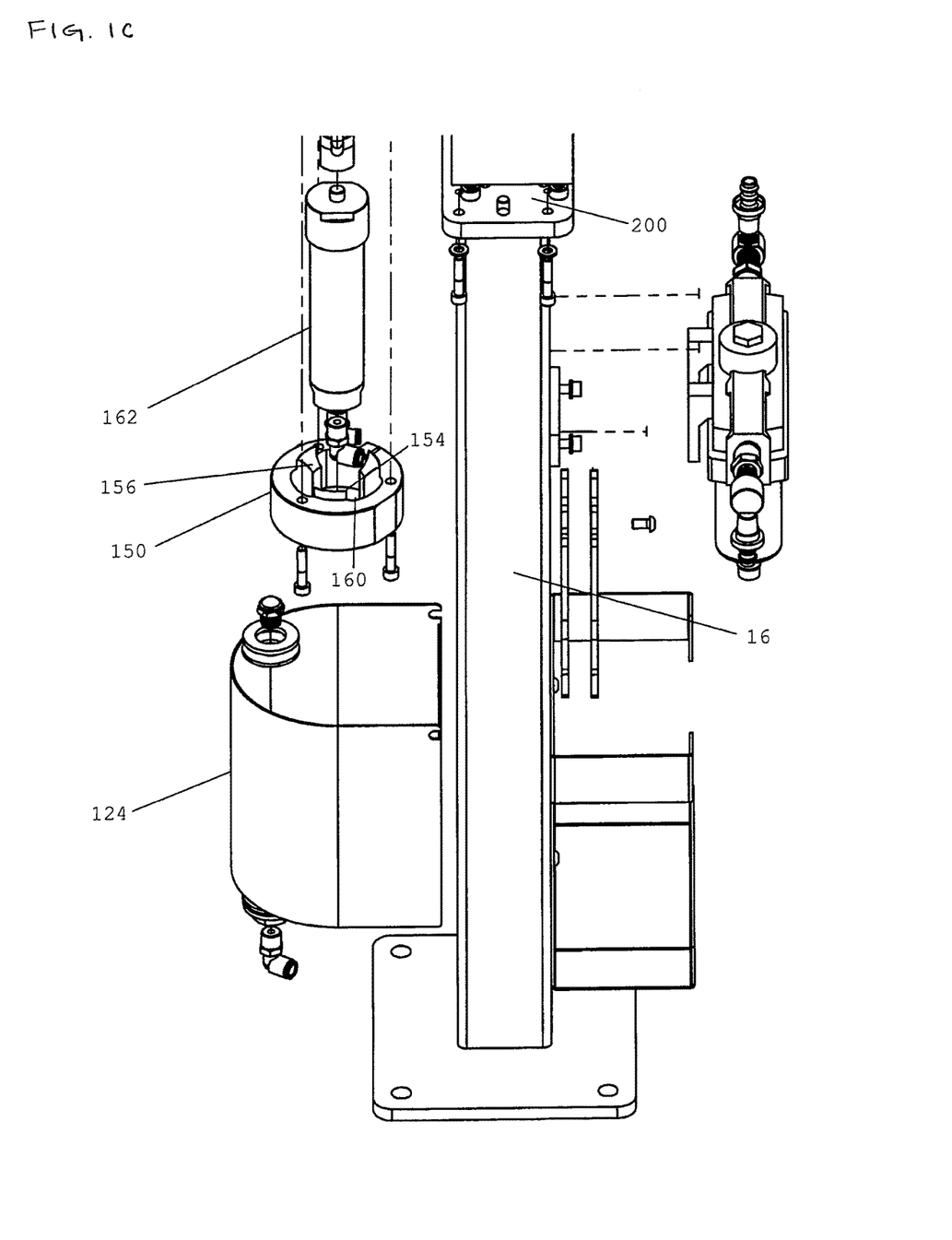
FIG. 1C is another partial exploded isometric view of the nozzle cleaning system, illustrating a motor member and a motor mount.

FIGS. 1A-1C illustrate a nozzle cleaning system 10 according to one embodiment of the present invention for use in cleaning a nozzle of a weld gun. The system 10 includes a guide module 12 for guiding the nozzle into a desired alignment and a reaming module 14 for cleaning the nozzle after it has been inserted. The guide module 12 is coupled to the reaming module 14, with both the guide module 12 and reaming module 14 being attached to a support stand 16, which provides a mounting structure for additional components used in the system 10. Additional features of the system 10 will be described in further detail below.

With reference to FIGS. 1A-C, 3 and 4, the guide module 12 includes a lower mounting ring 18, a housing tube 20, a holder assembly 22, and a cap 24. The housing tube 20 is mounted to the mounting ring 18. The holder assembly 22 is disposed within the housing tube 20. The cap 24 is mounted to the housing tube 20 opposite the mounting ring 18.

The mounting ring 18 includes a cylindrical body portion 26 and an annular flange portion 28 extending radially outward from an upper edge of the body portion 26. The mounting ring further includes a bottom wall portion 30 extending radially inward from the bottom edge of the body portion 26. The bottom wall portion 30 defines an opening 32 disposed in the center of the bottom wall portion 30 through which the distal tip of the nozzle can extend toward the reaming module 14. The reaming module 14 can likewise extend through the opening 32 into the guide module 12.

The opening 32 can have a counter-bore shape that defines an upwardly facing stop surface 34. Accordingly, the opening 32 can have a first diameter and a second diameter below the first diameter, where the first diameter is greater than the second diameter, with the difference between the diameters defining the size of the stop surface 34. The stop surface 34 is sized and arranged to receive a portion of the holder assembly 22, which is further described below.

The flange portion 28 of the mounting ring 18 defines an upper surface 36 to which the housing tube 20 is mounted and a lower surface 38 for mounting to additional structure of the system 10. The body portion 26 defines an internal surface 40 having a generally cylindrical shape, and further defines a plurality of cutouts 42 in the internal surface 40. The cutouts 42 are sized and arranged to accommodate the structure of the holding assembly 20.

With reference to FIGS. 3-6, the holding assembly 22 includes an outer holder member 44 and an inner holder member 46. The outer holder member 44 has a generally box type shape with curved edges. More particularly, the outer holder member 44 includes a plurality of flat outer surfaces 47 and a plurality of rounded transition surfaces 48 that connect adjacent ones of the flat outer surfaces 47.

Figure 5:
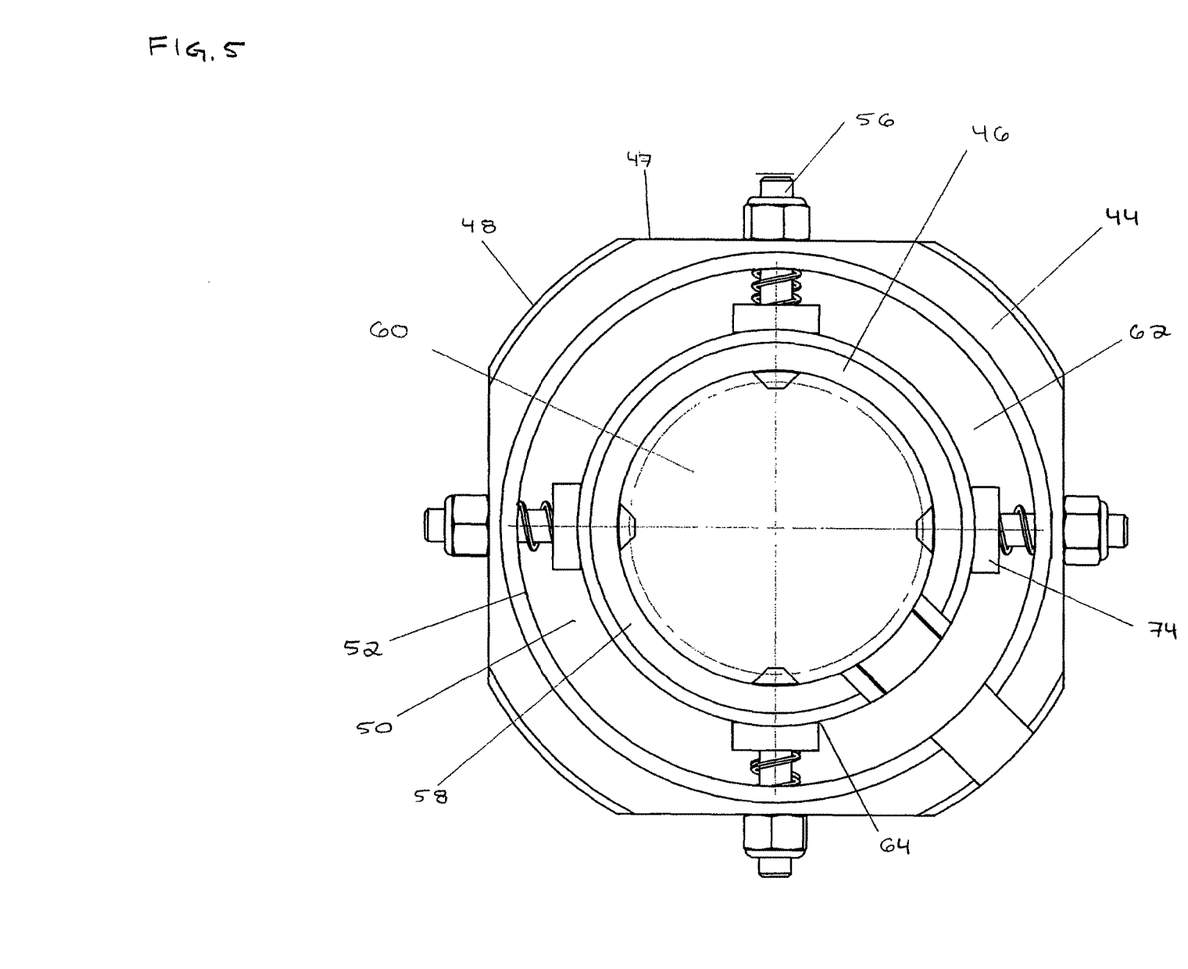
FIG. 5 is a top view of the holder assembly, illustrating an outer holder member, an inner holder member, and a plurality of skid bars extending through slots of the inner holder member.

As shown in FIG. 5, the rounded transition surfaces 48 have a curvature that generally corresponds to the curvature of the internal surface 40 of the mounting ring 18. The flat outer surfaces 47 are arranged to correspond and face the cutouts 42. In the illustrated embodiment, four outer surfaces 47 are shown, along with four cutouts 42. However, other quantities could also be used. The outer holder member 44 is sized to be received in the body portion 26 of the mounting ring 18 and supported on the bottom wall portion 30 thereof.

The outer holder member 44 further defines a central cylindrical cavity 50 and generally cylindrical inner surface 52. The cavity 50 extends through the top and bottom of the outer holder member 44, with the outer holder member 44 being open at both ends. The cavity 50 is sized and configured to receive the inner holder member 46 therein, with the inner holder member 46 spaced away from the inner surface 52.

With reference to FIG. 6, the outer holder member 44 further includes a plurality of internally threaded through-holes 54 extending though the flat outer surface 47. The through-holes 54 are sized and arranged to receive set screws 56 therein that are adjustable radially into and out of the outer holder member 44. Preferably, for each flat outer surface 47, there is a pair of longitudinally aligned through-holes 54, such that there is a lower through-hole and an upper through-hole, with corresponding set screws 56. The through-holes 54 are preferably disposed in the approximate lateral midpoint of the associated flat outer surface 47. The set screws 56 and their adjustment will be described in further detail below.

Figure 7:
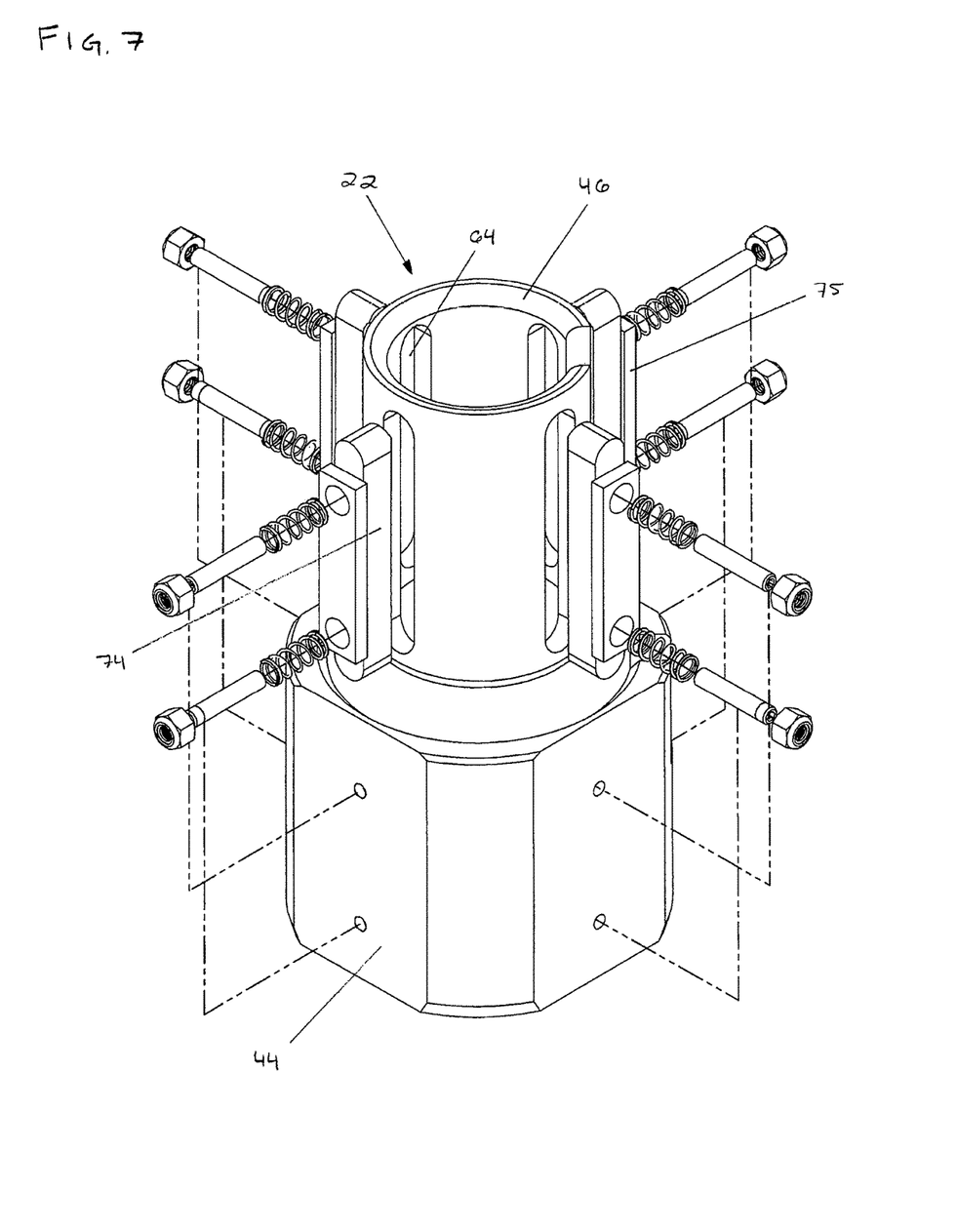
FIG. 7 is an isometric exploded view of the holder assembly.

As shown in FIGS. 5-7, the inner holder member 46 has a generally cylindrical tubular body portion 58 that defines a cavity 60 that is open at both the upper and lower ends. The outer diameter of the body portion 58 is smaller than the inner diameter of the outer holder member 44, thereby defining an annular space 62 therebetween when the inner holder member 46 is disposed within the outer holder member 44. The body portion 58 includes a plurality of elongate longitudinally extending slots 64 that extend through the body portion 58. The number of slots 64 will generally correspond to the number of pairs of through-holes 54 and set screws 56 described above. The slots 64 are configured to be arranged and aligned radially with the through-holes 54 and set screws 56.

Figure 3:
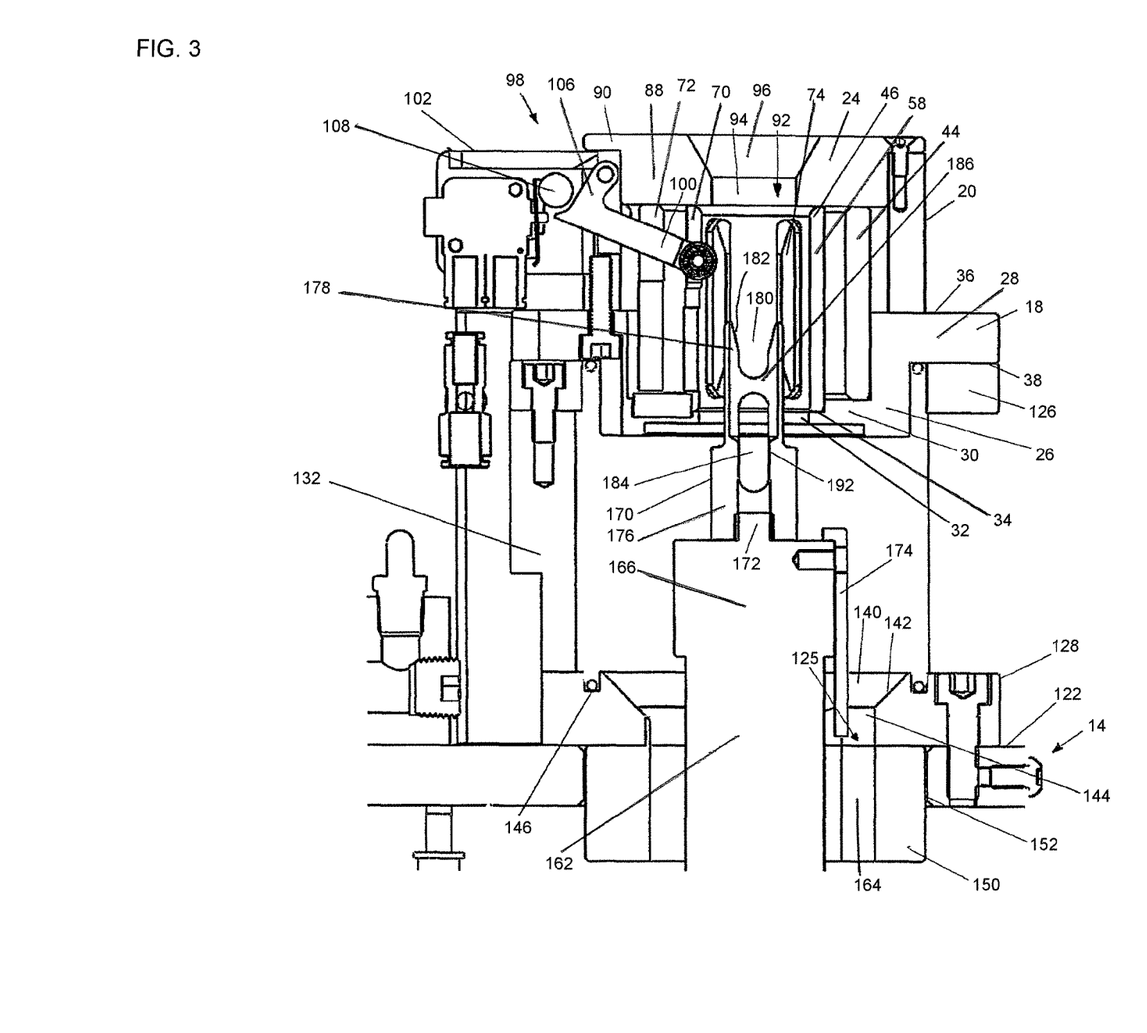
FIG. 3 is partial cross-section view of the system illustrating the guide module mounted in the system along with a reaming module having a reamer.
Figure 4:
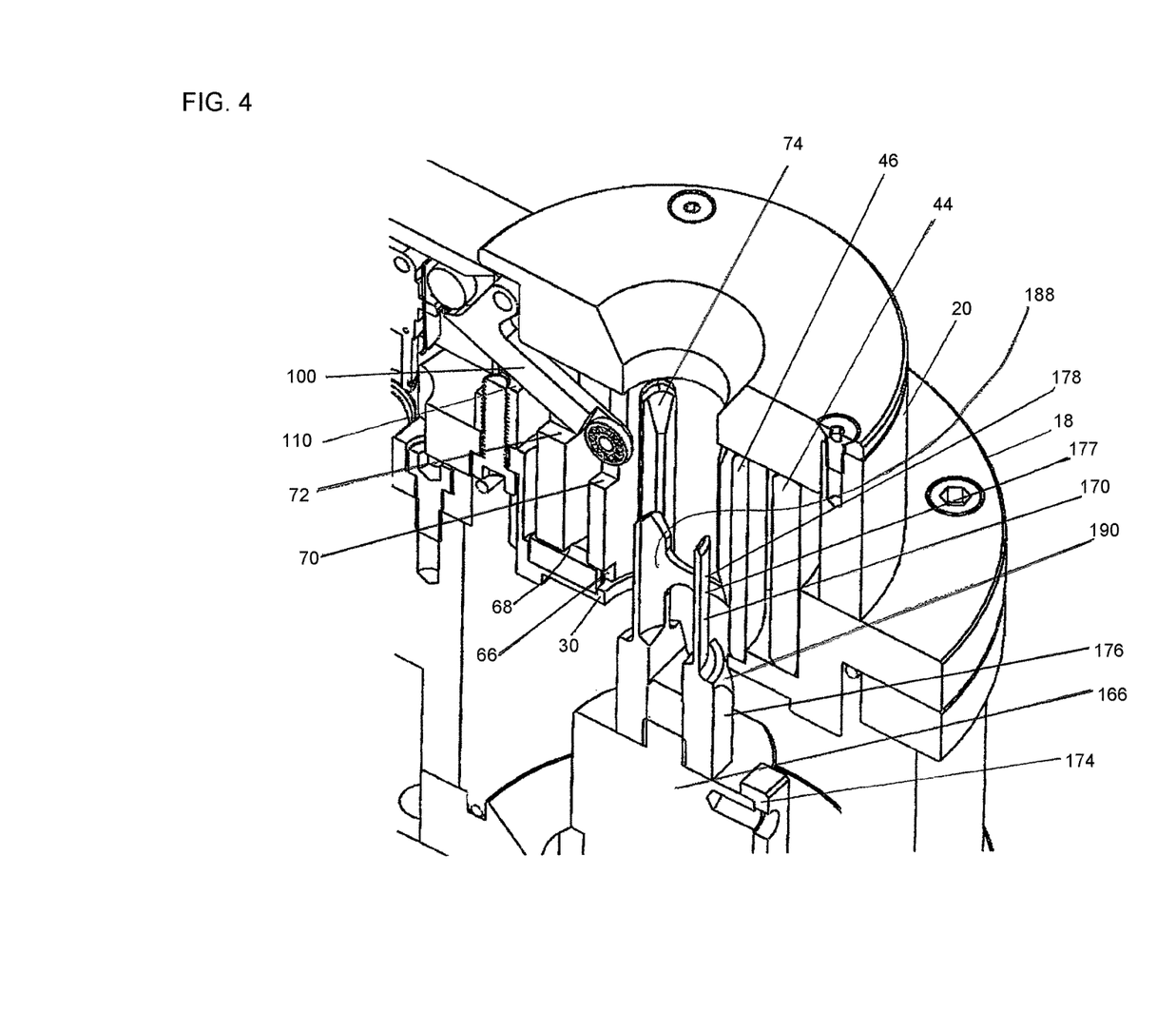
FIG. 4 is an isometric cross-sectional view illustrating the guide module, the holder assembly, and the reamer.

As shown in FIGS. 3 and 4, the inner holder member 46 has a height that is generally larger than the outer holder member 44. When installed within the outer holder member 44, the bottom of the inner holder member 46 will extend beyond the bottom of the outer holder member 44. The inner holder member 46 is sized and arranged to be received within the opening 32 defined in the bottom wall portion 30 of the mounting ring 18. In particular, the inner holder member 46 is sized and arranged to be supported on the stop surface 34 defined in the opening 32. Accordingly, the inner holder member 46 can have an outer diameter that corresponds to the upper diameter defined by the counter-bore shape of the opening 32.

With reference to FIG. 4, the inner holder member 46 and outer holder member 44 can each include a bottom alignment notch 66 and 68, respectively. The alignment notches 66, 68 correspond to an alignment pin disposed in the bottom wall portion of the mounting ring 18. Thus, the inner holder member 46 and the outer member 46 can be properly aligned relative to each other, thereby aligning the slots 64 and set screws 56.

With reference to FIGS. 3 and 4, the inner holder member 46 and inner holder member 44 can each include an upper notch 70 and 72, respectively that are radially aligned when the inner holder member 46 and inner holder member 44 are assembled and properly aligned. The upper notches 70 and 72 each extend downward from the upper edges of the holder members 44, 46, and can accommodate a depressible switch (further described below).

Turning now to FIGS. 5-7, the slots 64 of the inner holder member 46 are sized and arranged to each receive a skid bar 74 therein. Accordingly, the holding assembly includes a plurality of skid bars 74 corresponding to the number of slots 64. It will be appreciated, however, that in some embodiments some of the slots 64 could be left empty.

The skid bars 74 are sized and configured to be moveable radially in and out of the slots 64. The skid bars 74 have an elongate shape and extend longitudinally along the inner holder member 46 when installed. When viewed from above in the installed position, the skid bars 74 preferably have a tapered shape that tapers down toward the center of the inner holder member 46. The skid bars 74 can include an upper portion 76, a middle portion 78, and a lower portion 80. In one approach, the upper portion 76 is tapered such that the upper edge is disposed radially outward relative to the middle portion 78. This arrangement helps ease the insertion of the nozzle into the holder assembly 22. In a further approach, the lower portion 80 can also be tapered such that the lower end is disposed radially outward from the middle portion 78.

The middle portion 78 is preferably straight and extends longitudinally up and down along the holder assembly 22. Due to the tapered shape of the skid bars 74, an inner edge of the skid bar 74 is narrower than the width of the skid bar 74 at an outer portion thereof. The increased width at the outer portion of the skid bar 74 provides for sufficient slidable engagement with the slots 64. The narrow width of the inner edge reduces the surface area against which the nozzle will bear during insertion into the holder assembly 22, reducing friction and increasing ease of insertion.

The skid bars 74 are coupled at an upper portion and a lower portion to the set screws 56. More particularly, a single skid bar 74 is attached to a pair of set screws 56. The longitudinal alignment of the set screws 56 corresponds to the longitudinal alignment of the skid bars 74.

The skid bars 74 are preferably coupled to the set screws 56 via upper and lower cavities 82 defined in the outermost surface of the skid bars 74. The cavities 82 are sized and configured to receive the inner ends of the set screws 56. Further, the skid bars 74 are coupled to the set screws 56 via compression springs 84. The compression springs 84 extend into the cavities 82 as well as over the inner end of the set screws 56. In a nominal position, the inner end of the set screws 56 are spaced away from the base of the cavities 82.

Accordingly, the skid bars 74 can move toward the inner end of the set screws 56 when pushed radially outward. The inner end of the set screws 56 acts as a stop to limit the radial outward movement of skid bars 74. The skid bars 74 each include an outer portion 75, which has a width greater than the width of slots 64. When installed, the outer portions 75 limit the inward radial movement of the skid bars 74 as they are biased inward by the springs 84 due to the increased width relative to the slots 64, with the outer portions 75 also cooperating with the bias of the springs 84 to retain the skid bars 74 within the inner holder member 46. Together, the inner end of the set screws 56 and radial outer portion 75 of skid bars 74 limit the range of radial movement of skid bars 74.

Thus, the skid bars 74 are mounted to the outer holder member 44 via the set screws 56 and the compression springs 84, and can slide within the slots 64 of the inner holder member 46 when pushed radially outward. The compression springs 84, when compressed, will exert a return force on the skid bars 74 in a radially inward direction and toward the nominal position.

The nominal position of the set screws 56 and skid bars 74 can be set to define a diameter corresponding to the inner edges of each of the skid bars 74. The set screws 56 can be adjusted to alter the nominal position of each of the skid bars 74. By screwing the set screws 56 in or out via the through-holes 54, the diameter defined by the skid bars 74 can be selected to accommodate the desired outer diameter of the nozzle that is intended for cleaning. With the set screws 56 in their desired nominal position, jam nuts 86 can be installed over the outer ends of the set screws 56 and onto the flat outer surfaces 47 of the outer holder member 44. To readjust the nominal position of the skid bars 74, the jam nuts 86 can be loosened and the set screws 56 can be readjusted.

In the assembled state, the inner holder member 46 is disposed within the outer holder member 44 with the skid bars 74 positioned within the slots 64. The inner and outer holder members 46, 44 are disposed within the housing tube 20 and received in the mounting ring 18. The cap 24 is placed over the housing tube 20 and above the inner and outer holder members 46, 44.

With reference to FIGS. 3 and 4, the cap 24 includes a body portion 88 and an upper flange portion 90 extending radially outward from the body portion 88. The body portion 88 defines a passageway 92 extending longitudinally therethrough. The passageway includes a lower cylindrical portion 94 and an upper tapered portion 96 that tapers down toward the cylindrical portion 94 from the top of the cap 24, such that the width of the tapered portion 96 is greater at the top than at its interface with the cylindrical portion 94. The tapered portion 96 assists in the insertion of the nozzle into the guide module 12, and the cylindrical portion 94 acts a preliminary centering feature to preliminarily align the nozzle with the inner surfaces of the skids bars 74 disposed below the cap and supported by the inner and outer holder members 46, 44.

Preferably, the mounting ring 18 and housing tube 20 are fixedly attached to each other. The holder assembly 22 is preferably placed within the mounting ring 18 and housing tube 20 in a drop-in type engagement, where the holder assembly 22 can be easily removed by hand without requiring any specific tool. However, the holder assembly 22 is sized such that it will fit snugly within the mounting ring 18 in order to center the holder assembly 22 and the skid bars 74 in the desired location. The cap 24 is fixedly attached to the top of the housing tube 20, enclosing the holder assembly 22 within the mounting ring 18 and housing tube 20. The cap 24 is sized and configured such that the cylindrical portion 94 has an outer diameter that corresponds to the inner diameter of the housing tube 20, such that the cylindrical portion 94 of the cap 24 will slidingly fit within the housing tube 20. The cap 24 further has a depth such that when it is installed in the housing tube 20 over the holder assembly 22, the bottom surface of the cap 24 will engage the upper edges of the inner holder member 46 and the outer holder member 44 of the holder assembly.

The system 10 further includes a switch mechanism 98 for actuating the cleaning operation. The switch mechanism 98 includes an actuating finger 100 that is depressible in a downward direction when the nozzle is inserted into the holder assembly 22, and the mechanism 98 further includes a switch housing 102 that includes various other actuating elements. The finger 100 can include a roller bearing 104 at its radially inward tip in some cases. However, the finger 100 can also operate without the use of the roller bearing 104 in other cases.

The finger 100 is pivotally mounted to the switch housing 102. In one approach, the finger 100 includes an elbow portion 106 that bends upward from the finger 100, where the elbow portion 106 defines the pivot point, and the finger 100 is offset from the pivot point. When the finger 100 is pushed downward, finger 100 and elbow portion 106 will rotate about the pivot point. The inward end of the finger 100 will rotate downward, with the outward end of the finger 100 and the elbow portion 106 rotating upward. The upward rotational movement of the elbow portion 106 will contact an actuating element 108 such as a microswitch or other known switch, which can send a signal to a control unit to begin the reaming process, which can be in the form of an electrical motor driven process or a pneumatically driven process. Various other types of switch-responsive control methods known in the art could also be used. Preferably, a pneumatically driven process is used.

The finger 100 is sized and arranged to extend into the guide module 12 through a notch 110 defined in the side of the housing tube 20 and further through the notches 68 and 66 of the outer holder member 44 and the inner holder member 46. The notches 100, 68, and 66 are radially aligned when the guide module 12 is assembled to allow for the finger 100 to extend therethrough. The notches 100, 68, and 66 are sized and configured to allow the finger 100 to pivot and rotate downward when pushed.

With reference again to FIG. 2, the housing tube 20 further includes a flat outer surface portion 112 against which the switch housing 102 can be placed. In another approach, the switch housing 102 could have a curved mounting surface that could correspond to a curved outer surface of the housing tube 20. The switch housing 102 is further positioned on the upper surface of the flange portion 28 of the retainer ring 18. The switch housing 102 is preferably fastened to the retainer ring 18, but could alternatively be fastened to the housing tube 20.

With reference again to FIGS. 1A-C and 3, the reaming module 14 includes an upper can assembly 120 mounted above a base mount 122, and a lower catch can 124 mounted below the base mount 122, and a reaming assembly 125 mounted to the base mount 122 that extends within both the upper can assembly 120 and the lower catch can 124.

The upper can assembly 120 includes a top ring 126 and a bottom ring 128, with a cylindrical wall member 130 extending between the top ring 126 and the bottom ring 128. The top ring 126 and bottom ring 128 are connected to each other via a curved spacer member 132 and a pair of tie rods 134. Of course, other known connecting members or spacers could also be used. The wall member 130 is disposed radially within the spacer member 132 and tie rods 134 and extends between the top ring 126 and bottom ring 128.

The top ring 126 is arranged to provide a mounting for the guide module 12. In particular, the lower surface of the flange portion 28 of the mounting ring 18 will attached to an upper surface of the top ring 126. The top ring 126 further defines a cylindrical passageway 136 extending through the top ring 126. The passageway 136 is sized and arranged to receive the body portion 26 of the mounting ring 18 when the system is assembled. Further, the passageway 136 is also sized to receive the upper end of the wall member 130. The wall member 130 is therefore disposed radially between the body portion 26 of the mounting ring 18 and the top ring 126.

The bottom ring 128 is configured to be mounted to the base mount 122 and to provide a mounting for the wall member 130. The bottom ring 128 further defines a cylindrical passageway 140 extending therethrough. The passageway 140 has a tapered upper portion 142 and a cylindrical lower portion 144. The passageway 140 is sized and arranged to allow the reaming assembly 125 to extend therethrough with sufficient space between the reaming assembly 125 and the inner diameter of the bottom ring 128 to allow the removed debris to fall into the catch can 124. The tapered portion 142 of the passageway 140 acts as a funnel to capture debris and direct it inward for being received in the catch can 124 below.

The bottom ring 128 further defines an annular groove 146 in the top surface of the bottom ring 128. The annular groove 146 is sized and arranged to receive the bottom end of the wall portion 130. Thus, when assembled, the top ring 126, the bottom ring 128, and wall portion 130 combine to define an enclosure that surrounds the debris that is generated during the reaming process.

In one approach, the wall portion 130 can be made from a transparent material such as plastic. In this approach, operators can observe the debris that is generated during the reaming process. In another approach, the wall portion 130 can be made from another material that is not transparent if direct observation of the generated debris is not desired.

In an alternative approach, the top ring 126, bottom ring 128, and wall portion 130 can be replaced with a single component having a similar overall structure that can be attached between the mounting ring 18 of the guide module 12 and the base mount 122.

The reaming module 14 further includes a motor mount 150 that is sized and configured to fit within a passageway 152 defined by the base mount 122. The motor mount 150 has a generally cylindrical shape and is fastened to the bottom surface of the bottom ring 128 when assembled. The motor mount 150 defines a central passageway 154 that corresponds to the cylindrical portion 144 of the passageway 140 of the bottom ring 128. The motor mount 150 includes a plurality of protrusions 156 that extend radially inward from an outer body portion 158 of the motor mount 150. The protrusions 156 are spaced apart circumferentially around the passageway 154, thereby defining a plurality of outer passageways 160 disposed between circumferentially adjacent protrusions 156.

The inner surfaces of the protrusions 156 combine to define an inner diameter that corresponds to the outer diameter of the reaming assembly 125 at the location of the interface between the reaming assembly 125 and the motor mount 150. Thus, the motor mount 150 is sized and arranged to hold the reaming assembly 125. With the reaming assembly in an installed state, the middle of the passageway 154 is occupied by the reaming assembly 125, but the outer passageways 160 remain open. Thus, debris that is generated during the reaming process can pass through the outer passageways from the upper can assembly 120 to the lower catch can 124.

Turning now to the reaming assembly 125, as shown in FIGS. 1A, 1C, and 3, the reaming assembly 125 includes a motor member 162 having a generally elongate and cylindrical body portion 164 and a rotatable head portion 166 disposed at the top. The body portion 164 is sized to be mounted within the motor mount 150. The motor member 162 is preferably in the form of a pneumatically driven motor; however an electric motor could also be used. The rotatable head portion 166 is driven rotationally when activated, which causes the reaming process.

With reference to FIGS. 3 and 4, the cutting member or reamer 170 is attached to the top of the head portion 166, and extends longitudinally upward from the head portion 166. In one approach, the head portion 166 includes a post 172 extending upwardly, with the reamer 170 fastened to over the post 172. However, other methods of attaching the reamer 170 to the rotatable head portion 166 can also be used.

In addition to the reamer 170, a wiper member 174 is attached to the head portion 166 at a radially outboard edge. As shown, a single wiper member 174 is attached. However, multiple wiper members 174 could also be used. The wiper member 174 is attached to outer surface of the head portion 166, and has an elongate shape extending downward from the top of the head portion 166. The wiper member 174 is sized such that it will extend into the passageway 140 of the bottom ring 128 when the system 10 is assembled. The wiper member 174 is preferably longer than the height of the head member 166, such that the bottom edge of the wiper member 174 extends beyond the bottom edge of the head member 166. During the reaming process, the wiper member 174 will break up, disengage, loosen, or wipe debris that is generated during the reaming process, limiting buildup of debris within the upper can 120 and in particular in the area of the passageway 140 of the bottom ring 128.

The reamer 170, being attached to the rotatable head portion 166, is the component that performs the reaming and cleaning function of the system 10 by rotating and scraping or otherwise cleaning the nozzle to remove the buildup of weld spatter. The reamer 170 includes a lower base portion 176, which is the portion that attaches to the rotatable head portion 166 of the motor 162. The reamer further includes an upper blade portion 177 that defines a pair of blades 178 at an upper end thereof. The blade portion 177 defines a generally curved outer surface that is sized to be slightly smaller than the inner diameter of the nozzle to be cleaned, but large enough to sufficiently contact and scrape weld spatter that is built up on the nozzle. The blades 178 include a generally curved upper edge. The blade portion 177 further defines a pair of cutouts 180 disposed circumferentially between the blades 178 and extending downward from the upper edge of the reamer 170. The cutouts 180 and the blades 178 combine to define reaming edges 182 that can scrape the buildup within the nozzle. The cutouts extend radially through the blade portion 177.

The blade portion 177 and base portion 176 further define a pair of slots 184 disposed longitudinally below the cutouts 180. The slots 184 extend radially through the blade portion 177 and base portion 176. A connecting portion 186 extends between the blades 178, with the connected portion 186 being disposed between the cutouts 180 and the slots 184, specifically below the cutouts 180 and above the slots 184.

The blade portion 177 and the base portion 176 combine to define an inner cavity 188. The inner cavity 188 is in fluid communication with areas outside of the reamer via the slots 184 and cutouts 180. Thus, when debris and spatter build up is removed from the nozzle, it will fall into the cavity 188 of the reamer 170, and will be thrown outward from the cavity 188 through the slots 184. More particularly, when the nozzle is inserted onto the reamer 170, the end of the nozzle will cover an upper portion of the slots 184, so the debris will exit through the bottom of the slots 184 through the base portion 176 when the nozzle is fully inserted.

The depth of nozzle insertion is can be controlled via the base portion 176 of the reamer 170. The base portion 176 defines a shoulder 190 at the top of the base portion 176 at the interface between the base portion 176 and the blade portion 177. The shoulder 190 acts as a stop against the insertion of the nozzle. Thus, when the nozzle is inserted over the reamer 170, the end of the nozzle will contact the shoulder 190, limiting the depth of insertion. The can ensure that the nozzle is not inserted too far, which could damage other components of the weld gun disposed further up the nozzle. This can further ensure that the lower portion of the slots 184 remains in fluid communication with areas outside the reamer 170, such that debris can exit the cavity 188 during the reaming process with the nozzle in the inserted position.

The slots 184, being extended radially through the base portion 176 as well as the blade portion 177, thereby interrupt the shoulder 190 at the location of the slots 184. Thus, the shoulder 190 is in two portions. Accordingly, the shoulder 190 and slots 184 combine to define a wiping edge 192 at the interface between the shoulder 190 and the slots 184. The wiping edge 192 can operate to scrape, clean, or wipe the end of the nozzle when the nozzle contacts the shoulder 190 during the reaming process.

As shown in FIGS. 1A, 1C, and 3, the lower catch can 124 is positioned below the upper can 120, the reamer 170, and the motor mount 150. The lower catch can 124 operates to catch, receive, and retain the debris that is generated during the reaming process. The catch can 124 defines a generally enclosed cavity 194 when installed on the system 10. The bottom end of the motor member can extend into the cavity 194 when assembled, with the pneumatic or electric conduit extending through a sidewall of the catch can 124, if necessary.

The above described components are ultimately connected to the base mount 122, as shown in FIGS. 1A, 1B, and 3. The base mount 122 can be attached to a stand 200, which can support various other components and conduits for use in the process, such as pressure regulators and air supply lines.

The system 10 can further include a control housing 202 that is mounted to the base mount 122 and disposed adjacent the guide module 12 and upper can 120 and above the stand 200. The control housing 202 includes various supply conduits, such as pneumatic lines, valves, and regulators, as desired. The control housing 202 can further include the actuating element 108 that is actuated by the finger 100, with the element 108 being connected via a control conduit to ultimately control the motor member to start the reaming process.

In one approach, as shown in FIGS. 1A and 1B, the system 10 can include a venturi member 210 for supplying an anti-spatter spray to the nozzle during the reaming process. The venturi member 210 can be activated via the switching mechanism 98, such that the spray will commence at approximately the same time as the reaming process.

The venturi member 210 is preferably mounted to the bottom ring 128 and inclined upward toward the location of the reamer 170. The venturi member 210 is connected via a fluid conduit to an anti-spatter material supply can (not shown), which can be mounted to the side of the control housing 202 and can supply the venturi with the spray material through a fluid conduit.

Having described the structure of the system 10 above, the operation of the system 10 will now be described, with reference to the already described functionality of many of the components above.

To begin the cleaning process, the weld gun is removed from the welding process. The weld gun is positioned above the system 10, and the nozzle of the weld gun is positioned above the cap 24 and the passageway 92 of the cap 24. Preferably, the operator will attempt to align the longitudinal axis of the nozzle with the longitudinal axis of the passageway 92 of the cap 24. However, the cylindrical portion 94 of the cap 24 will typically not permit the nozzle to be inserted at an angle that is largely transverse to the longitudinal axis of the guide module 12.

The nozzle will be inserted through the passageway 92 of the cap 24. While it is possible that the nozzle may be slightly misaligned during this insertion, subsequent contact with the holder assembly 22 will work to properly align the nozzle. As the end of the nozzle clears the bottom of the cap 24, the nozzle will contact the inner end of the finger 100 of the switching mechanism 98 and move it downward. The downward movement of the finger 100 will cause the finger 100 to rotate about its pivot point, which will actuate the actuating element 108.

Actuation of the switching mechanism 98 will activate the motor, which will cause the reamer 170 to rotate. Thus, the reamer 170 may begin to rotate prior to the nozzle making contact with the reamer 170. This is desirable because otherwise the reamer 170 would be in contact with the spatter buildup on the nozzle before rotation begins, which could cause the reamer 170 and nozzle to bind up. Additionally, starting the reamer 170 after the nozzle had already been fully inserted could cause the weld gun to be rotated along with the reamer 170, which would be undesirable.

As the nozzle is being inserted past the finger 100 and actuating the reamer 170, the nozzle will make contact with the upper end of the skid bars 74. If the nozzle is misaligned, the tapered upper portion 76 of the skid bars 74 will urge the nozzle back toward the center.

With the skid bars 74 mounted to the set screws 56 via the compression springs 84, the nozzle making contact with the skid bars 74 at an angle will limit the risk of damage to the nozzle.

The elongate nature of the skid bars 74 will align the nozzle to the appropriate longitudinal orientation. As the nozzle continues to be inserted, the skid bars 74 will combine to align the nozzle, and the nozzle will become aligned according to the skid bars 74.

With the nozzle in the correct alignment, it will extend over the rotating reamer 170. It will also be sprayed with anti-spray via the venturi 210. As the nozzle is inserted over the reamer, the rotating blades 178 will contact the spatter buildup inside the nozzle. The reaming edges 182 will scrape away the build up as the reamer rotates. The generated debris from this process will drop into the cavity of the reamer 170 and exit the cavity through the slots 184.

As the nozzle makes contact with the shoulder 190 of the reamer 170, its insertion will be stopped. The wiping edges of the reamer 170 will clean the bottom end of the nozzle. At this point, the upper ends of the blades have extended deep into the nozzle, having scraped away spatter buildup as is moved deeper. Generated debris will continue to exit the reamer 170 through the slots 184.

As debris exits the reamer, it will fall into the upper can 120 and toward the bottom ring 128. As the reamer 170 is rotating and generating debris, the wiper 174 will rotate with it. Thus, the wiper 174 rotates through the top of the passageway 140 of the bottom ring 128, limiting debris from building up in that area and potentially blocking debris from further falling. The loose debris will continue through the bottom ring 128 and through the passageways 160 of the motor mount 150, and ultimately into the catch can 124.

At the conclusion of the cleaning process, the nozzle will be retracted from the system 10. As the nozzle is pulled up from the rotating reamer 170, it will be pulled up through the skid bars 74. The reamer 170 will continue to rotate after the nozzle has been removed as long as the finger 100 is still depressed. Once the end of the nozzle reaches the top of the skid bars 74, the finger 100 will return to its upward position, deactivating the switching mechanism 98, which will stop the reamer from rotating.

The process can be repeated with the same nozzle if the nozzle requires additional cleaning. The system 10 will remain in a ready state to being cleaning subsequent nozzles as necessary. Operators simply have to insert a correctly sized nozzle into the system 10, and the reamer 170 will automatically begin to rotate and clean the nozzle by simply inserting it into the system 10.

The system can be easily modified to be used on different size nozzles, as desired. The reamer 170 can be easily replaced on the motor 162 after selecting the appropriate size reamer 170 that corresponds to the inner diameter of the nozzle to be cleaned.

Figure 8:
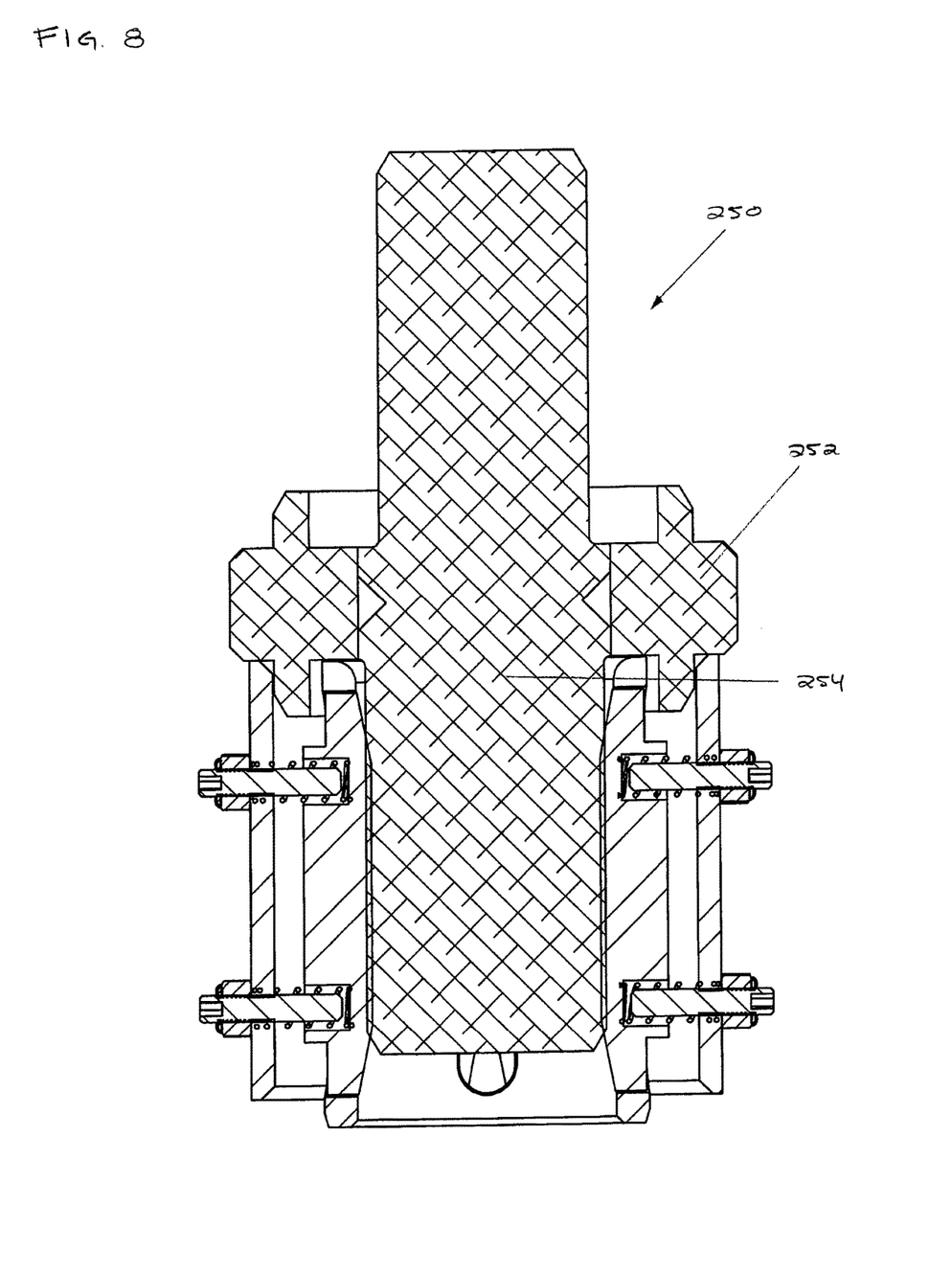
FIG. 8 is a cross-sectional view of a setup tool for use with the holder assembly for setting a desired position of the skid bars within the slots of the inner holder member.
Figure 9:
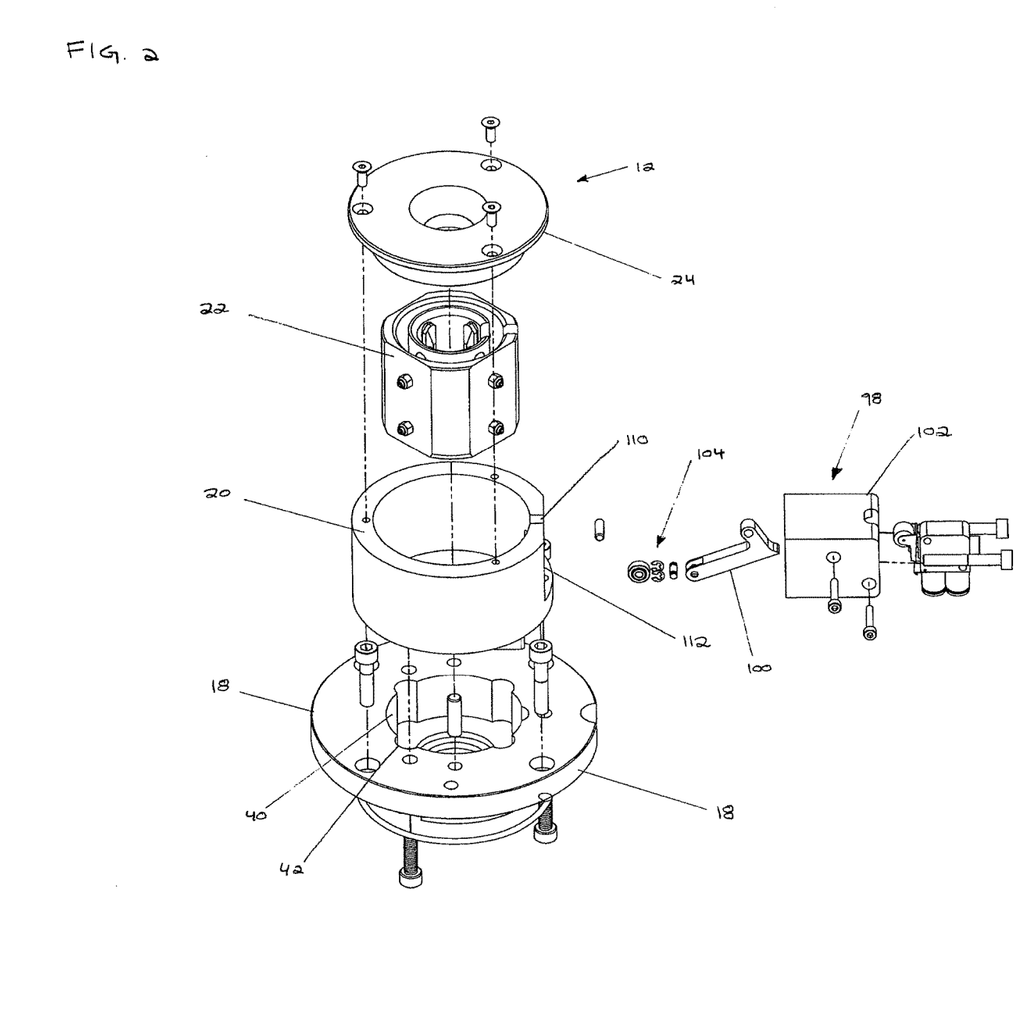

Similarly, the skid bars 74 can be easily adjusted to be set to the correct diameter that corresponds to the outer diameter of the nozzle to be cleaned. Preferably, a setup tool 250 is used to set the skid bars 74 to the correct radial spacing. The setup tool 250 includes a flange portion 252 that is sized to fit into the top of the holder assembly 22. The setup tool 250 further includes a cylindrical post 254 that extends downward from the flange portion 252. The post 254 is sized to correspond to the outer diameter of the nozzle to be cleaned (or be slightly larger than the outer diameter of the nozzle). The post is inserted between each of the skid bars 274, and is centered due to the centered placement of the flange portion 252. The set screws 56 are adjusted inward, where they act against the skid bars 74. The ends of the set screws will bottom out against the skid bars, forced the skid bars 74 against the outer surface of the post 254.

When the skid bars have been pressed against the post 254 via the set screws 56, the post 254 can be retracted. The skid bars 74 will spring inward slightly due to the compression springs 84. When the nozzle is later inserted, even if it is misaligned, it will be guided inward due to the tapered upper portion of the skid bars 74. The setting of the skid bars 74 will force the nozzle into the correct centered position. Accordingly, the diameter defined by the skid bars 74 in their bottomed out position can be set with a high degree of precision using the setup tool, with the selected diameter being dependent on user needs and tolerances.

Thus, the above described invention provides an improved nozzle cleaning system 10 with improved alignment properties and ease of use. The adjustability of the system to accommodate different sized nozzles provides a robust solution for welding operations.

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. An apparatus for cleaning a nozzle of a weld gun, the apparatus comprising:
   a guide module for receiving and guiding a weld gun nozzle along a first insertion direction;
   a reaming module having a rotatable reamer, the reaming module coupled to the guide module;
   a holder assembly of the guide module, the holder assembly including a plurality of elongate skid bars extending in direction corresponding to the first insertion direction;
   wherein the skid bars are non-rotatable and combine to define a diameter that generally corresponds to the diameter of the nozzle to be cleaned;
   wherein the holder assembly comprises an inner holder member, the inner holder member defines a plurality of elongate slots, and the plurality of skid bars are disposed within the slots; and
   wherein the holder assembly further comprises an outer holder member, the inner holder member is disposed within the outer holder member, and the skid bars are resiliently mounted to the outer holder member and moveable radially inward and outward to slide within the slots of the inner holder member.

2. The apparatus of claim 1, wherein the skid bars are resiliently mounted within the holder assembly, the skid bars have a first position and a second position, and the skid bars will move radially outward from the first position to the second position in response to insertion of a nozzle and are biased toward the first position to return to the first position after removal of the nozzle.

3. The apparatus of claim 1 further comprising a switch mechanism coupled to the guide module, the switch mechanism including a pivotable finger member, the finger member actuating a switch member of the switch mechanism in response to being forced in a first direction, wherein the switch member is operatively coupled to the rotatable reamer, and the rotatable reamer rotates in response to actuation of the switch member.

4. The apparatus of claim 3, wherein the finger member extends through notches of a holder assembly of the guide module, and an inner tip of the finger member is disposed with a path of insertion of the nozzle to be actuated in response to the nozzle being inserted.

5. The apparatus of claim 3, wherein the switch member is actuated by the finger with the finger remaining disposed above the reamer, such that the reamer will rotate prior to a nozzle making contact with the reamer.

6. The apparatus of claim 1, wherein the guide module includes a cap disposed above the holder assembly, the cap defining a central passageway having a tapered upper portion for guiding a nozzle into the skid bars.

7. The apparatus of claim 1, wherein the reamer extends into the guide module, and an upper end of the reamer is disposed radially within the skid bars, such that a portion of the reamer and a portion of the skid bars overlap along the direction of insertion.

8. The apparatus of claim 1, wherein the reamer is mounted to a rotatable head member of a motor, and a wiper member is mounted to the head member and extends in a direction opposite the reamer.

9. The apparatus of claim 1, wherein the reamer includes a base portion and a blade portion, the base portion defining a shoulder, the shoulder configured to act as a stop to limit the insertion of a nozzle onto the reamer.

10. The apparatus of claim 1, wherein the reamer module includes an upper can assembly and a lower catch can, the guide module is mounted above the upper can assembly, and the lower catch can is mounted below the upper can assembly.

11. The apparatus of claim 8, wherein the motor is mounted to a motor mount, the motor mount being disposed below the guide module and defining a plurality of passageways therethrough when the motor is mounted, the passageways configured to permit debris to fall therethrough.

12. The apparatus of claim 8, wherein the reamer module includes a bottom ring disposed below the reamer, the bottom ring defining a passageway therethrough, and the wiper extends into the passageway for limiting build-up of debris in the passageway.

13. The apparatus of claim 1 further comprising a venturi member disposed below the reamer and directed upwardly toward the reamer, the venturi member configured to apply an anti-spatter spray to a nozzle inserted into the apparatus.

14. A guide module for aligning a nozzle of a weld gun with a nozzle cleaner, the guide module comprising:
   an outer holder member defining an inner cavity and a longitudinal axis;
   an inner holder member disposed within the outer holder member, the inner holder member including a sidewall portion;
   a plurality of elongate slots extending through the sidewall portion of the inner holder member and extending longitudinally;
   a plurality of elongate skid bars disposed within the plurality of slots;
   wherein the skid bars are mounted to the outer holder member and being biased toward a nominal position, the skid bars being configured to be moveable away from the longitudinal axis against the bias upon contact with the nozzle.

15. The guide module of claim 14, wherein the skid bars are mounted to the outer holder member via set screws, the set screws being adjustable relative to the outer holder member to adjust the nominal position of the skid bars for accommodating a desired nozzle size.

16. The guide module of claim 14, further comprising a retaining ring having a body portion, the outer holder member and inner holder member being disposed within the body portion of the retaining ring, the guide module further comprising a housing tube attached to the retaining ring that surrounds the outer holder member, and a cap member attached to the housing tube and enclosing the outer holder member and inner holder member within the retaining ring, the housing tube, and the cap, wherein the cap defines a passageway for receiving the nozzle to be cleaned, and the retaining ring defines a passageway for receiving a reamer, such that the nozzle to be cleaned can be inserted through the cap, along the skid bars, and onto the reamer.

17. The guide module of claim 15, wherein the skid bars are attached to the set screws via compression springs for biasing the skid bars toward the nominal position.

18. A method for cleaning a nozzle of a weld gun, the method comprising:
   inserting a nozzle in a first direction toward a guide module, the guide module comprising a holder assembly including an inner holder member, the inner holder member defining a plurality of elongate slots and including a plurality of elongate skid bars disposed within the slots, the holder member further comprising an outer holder member, the inner holder member is disposed within the outer holder member, and the skid bars are resiliently mounted to the outer holder member and moveable radially inward and outward to slide within the slots of the inner holder member;
   inserting the nozzle within the skid bars;
   contacting an inner surface of the skid bars with the nozzle;
   pushing the skid bars radially outward in response to insertion of the nozzle;
   aligning the nozzle with the skid bars;
   rotatably driving a reamer;
   inserting the nozzle over the reamer while the nozzle is in contact with the inner surfaces of the skid bars.

* * * * *